United States Patent [19]
Jaeger et al.

[11] 3,992,937
[45] Nov. 23, 1976

[54] APPARATUS FOR LAPPING AND TESTING TWO MESHING GEARS WHOSE AXES ENCLOSE A RANDOM ANGLE WITH ONE ANOTHER

[75] Inventors: Hans Jaeger, Volketswil; Erich Kotthaus, Wallisellen; Ulrich Raess, Regensdorf, all of Switzerland

[73] Assignee: Werkzeugmaschinenfabrik Oerlikon-Buhrle AG, Zurich, Switzerland

[22] Filed: Mar. 1, 1976

[21] Appl. No.: 662,808

[30] Foreign Application Priority Data
Mar. 24, 1975 Switzerland.......................... 3773/75

[52] U.S. Cl....................................... 73/162; 51/26
[51] Int. Cl.²................... G01M 13/02; B23F 19/04
[58] Field of Search............................ 73/162; 51/26

[56] References Cited
UNITED STATES PATENTS
1,909,088   5/1933   Bauer.................................... 73/162

Primary Examiner—Richard C. Queisser
Assistant Examiner—S. Clement Swisher
Attorney, Agent, or Firm—Werner W. Kleeman

[57] ABSTRACT

An apparatus for lapping and testing two gears which are in meshing engagement with one another and axes of which enclose a random angle with one another wherein an auxiliary device is arranged at a lapping- and testing machine for gears, the axes of which enclose a right angle with respect to one another and which possesses two work spindles rotatably mounted in headstocks. This auxiliary device is fixed to one of both arrestable work spindles and possesses a third work spindle which is inclined at a predetermined angle relative to the other two work spindles.

7 Claims, 4 Drawing Figures

3,992,937

APPARATUS FOR LAPPING AND TESTING TWO MESHING GEARS WHOSE AXES ENCLOSE A RANDOM ANGLE WITH ONE ANOTHER

BACKGROUND OF THE INVENTION

The present invention relates to a new and improved construction of apparatus for lapping and testing two gears which are in meshing engagement with one another and the axes of which enclose a random or optional angle with one another.

Lapping- and testing machines are known to the art for two gears, the axes of which enclose a right angle with respect to one another. On the other hand, there are known lapping- and testing machines for gears, the axes of which enclose a random or optional angle with respect to one another.

Machines of the second type are used relatively seldom, and thus, in a great many factories or plants there are only present machines of the aforementioned first type. Yet, if in a plant gears are to be lapped and checked, the axes of which enclose a random angle with respect to one another, then it is necessary to either purchase a machine of the second type, which however will not be fully utilized, or else attempt to locate a factory possessing such type machine for the use thereof.

SUMMARY OF THE INVENTION

It is a primary object of the present invention to overcome the aforementioned shortcomings and drawbacks prevailing with the prior art equipment of this type.

Another and more specific object of the present invention aims at avoiding the aforementioned difficulties and enabling plants or persons which only possess machines of the aforementioned first type to also lap and test gears, the axes of which enclose a random angle with respect to one another, without such plant or person being forced to purchase or acquire expensive machines of the second type.

Still a further object of the present invention aims at the provision of an auxiliary or supplementary device which can be incorporated into a lapping- and testing machine for gears, the axes of which are at a right angle to one another, to augment the field of use of such machine so that it can also lap and test gears, the axes of which enclose a random angle with respect to one another.

Now in order to implement these and still further objects of the invention, which will become more readily apparent as the description proceeds, the invention contemplates arranging an auxiliary or supplementary device at a lapping- and testing machine for gears, the axes of which enclose a right angle with regard to one another and which machine embodies two work spindles rotatably mounted in headstocks. The auxiliary device is attached at one of both arrestable work spindles and possesses a third work spindle which is inclined through a predetermined angle relative to both of the other work spindles.

According to a preferred exemplary embodiment it is possible to provide a second auxiliary or supplementary device having a fourth work spindle which is inclined at a predetermined angle relative to the third work spindle.

The auxiliary device preferably can comprise the following components: A holder which is secured at one of the work spindles, a wedge-shaped intermediate element of random angle, a spindle carrier or support in which there is rotatably mounted the third work spindle operatively connected with a drive- and braking element.

According to a further advantageous embodiment of the invention the auxiliary device can comprise the following components: A holder which is secured at one of the work spindles, a spindle carrier or support which is mounted to be pivotable about its axis upon the holder and in which there is rotatably mounted the work spindle connected with the drive- and braking element. Further, there is provided means for securing against rotation the spindle carrier upon the holder.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. I is a plan view of a lapping machine containing a first exemplary embodiment of apparatus, namely auxiliary or supplementary device, and an acute-angle drive arrangement;

Figure 1:
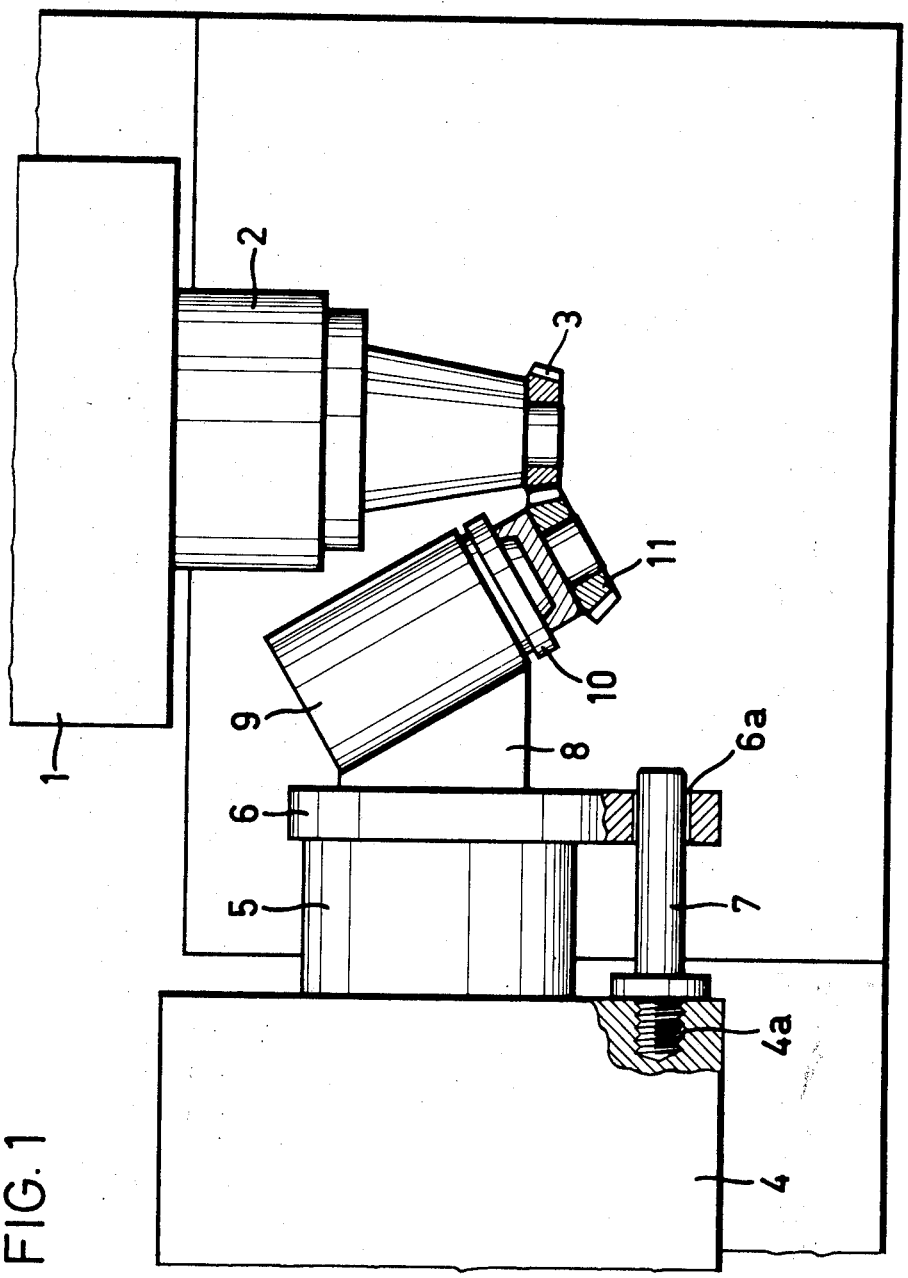
Figure 2:
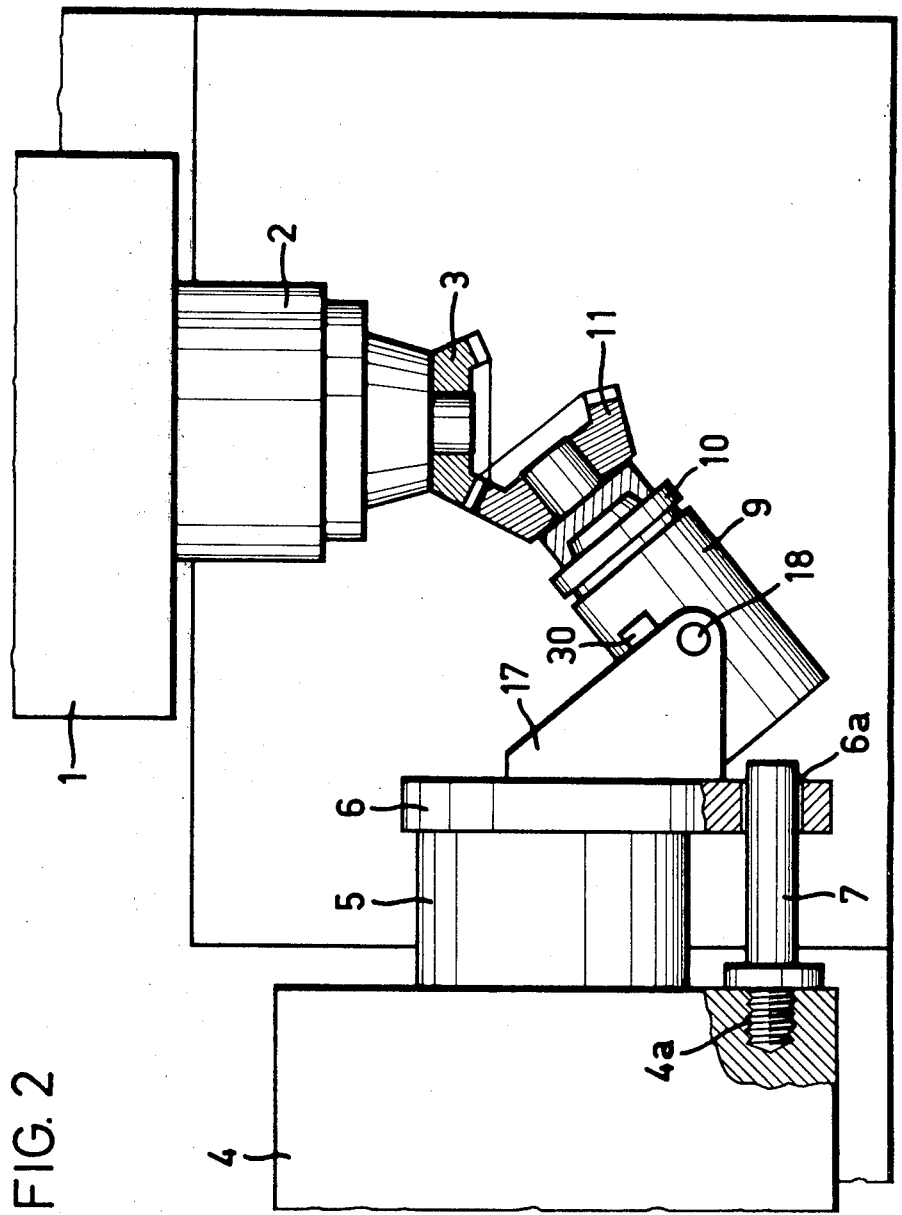

FIG. II is a plan view of the same lapping machine equipped with a second exemplary embodiment of the auxiliary device and an obtuse-angle drive;

FIG. III is a longitudinal sectional view through a spindle carrier or support; and FIG. IV is a plan view of the same lapping machine as shown in FIGS. I and II incorporating a third exemplary embodiment of inventive auxiliary device.

DETAILED DESCRIPTION OF THE PREFERRED EMBODIMENTS

Describing now the drawings, it is to be understood that throughout the various figures there have been generally used the same reference characters to denote the same or analogous components. According to the showing of FIG. I it will be seen that a first spindle 2 is mounted in a first headstock 1, the spindle 2 being driven in conventional manner by any suitable drive motor which has therefore not been particularly illustrated to simplify the showing of the drawings. Secured to the spindle 2 is the one gear 3 of the gears which are to be lapped. A second spindle 5 is mounted in a second headstock 4. Secured to the second spindle 5 is a holder 6 and with the aid of additional elements or means the spindle 5 or the holder 6 can be secured against rotation. In the embodiment under discussion such means comprises a bolt 7 or equivalent expedient which engages with the holder 6, for instance as shown having one end extending into a bore 6a of the holder 6 and the other end of which is secured, as by the threading 4a, at the headstock 4. It thus will be apparent that the bolt 7 secures the spindle 5 with the holder 6 against rotation.

Figure 3:
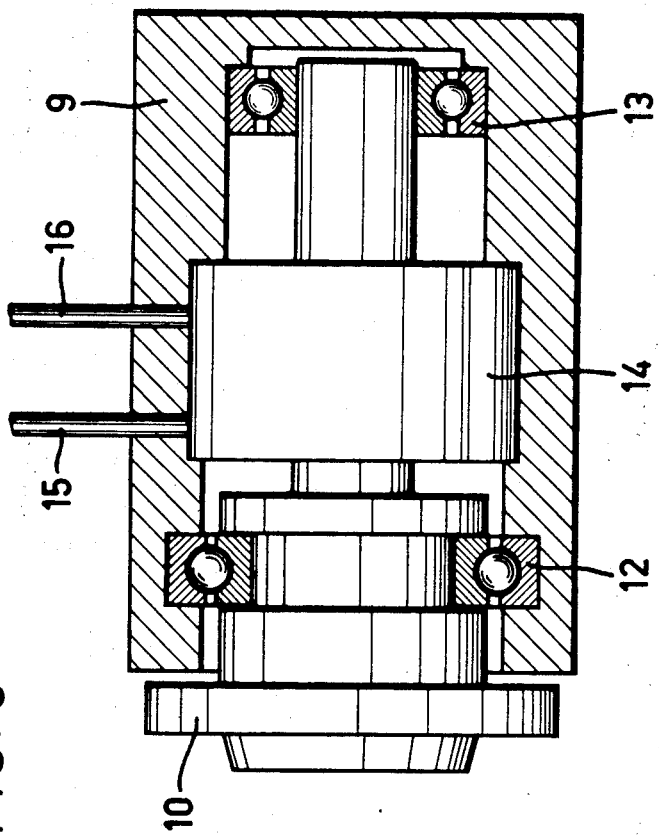
Figure 4:
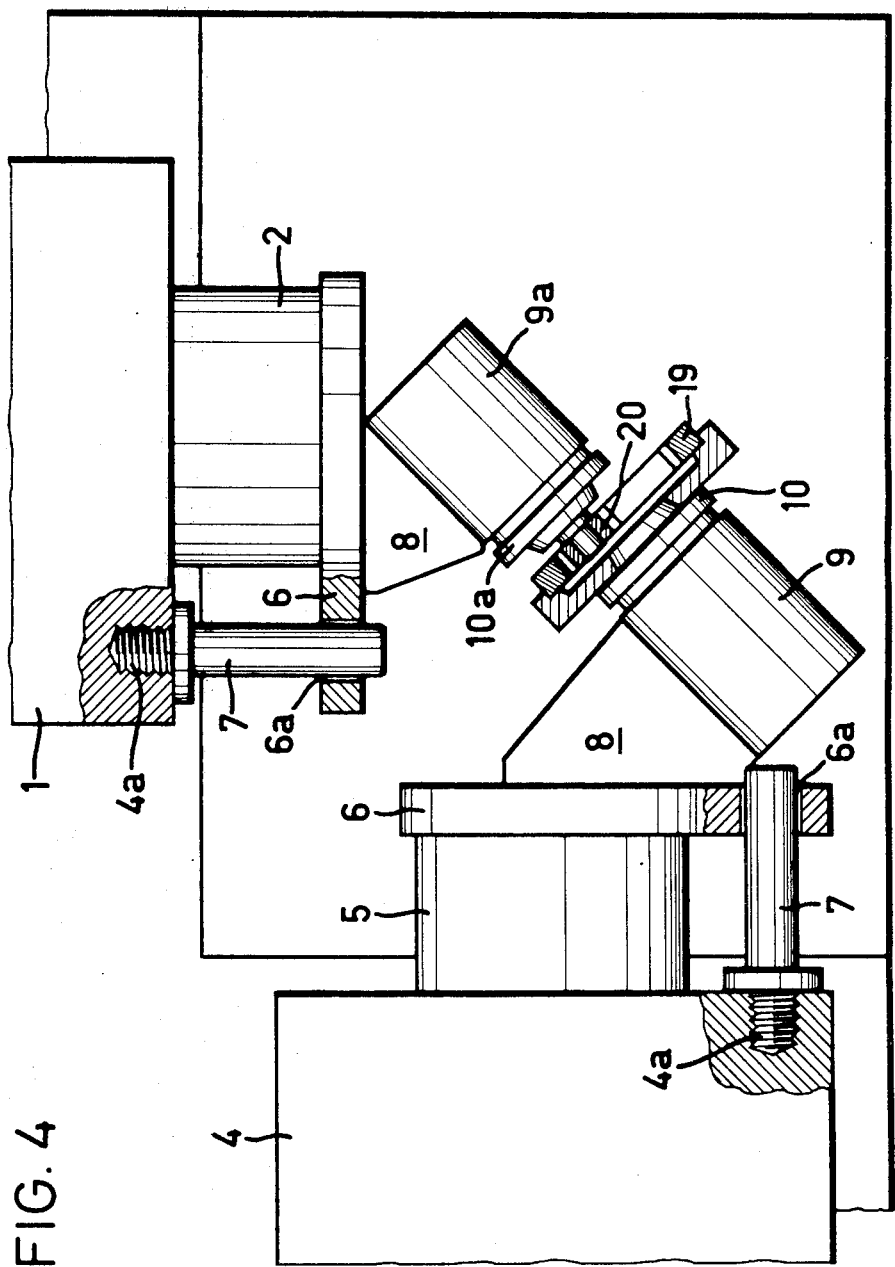

Continuing, by means of an intermediate element or member 8 a spindle carrier or support 9 is secured to the holder 6. In the spindle carrier 9 there is rotatably mounted a third spindle 10. At this third spindle 10 there is attached the second gear 11 of the gears 3, 11 which are to be lapped. The spindle 10, as best seen by referring to FIG. 3, is mounted in the spindle carrier or support 9 upon two bearings 12 and 13. For driving and braking the spindle 10 there is arranged between the bearings 12 and 13 a suitable drive and braking means, here shown in the form of a hydraulic unit or assembly 14 by means of which the spindle 10 can be selectively driven or braked. Connected with the hydraulic unit 14 are two flexible hydraulic hoses or conduits 15 and 16 in order to be able to drive the unit as a motor or as a pump for braking purposes so that there can be produced the necessary lapping pressure during lapping. The intermediate element 8 governs the angle between the axes of the spindles 2 and 10. This angle can be randomly selected to be between 0° and 180°, and for each angle there is required a predetermined intermediate element 8.

If it is desired to be able to randomly adjust the angle, then according to the showing of FIG. II, the spindle carrier 9 can be pivotably secured to the holder 6. For this purpose there are provided at the holder 6 two flaps or tabs 17 or equivalent structure, only one of which is visible in the showing of the drawings. Rotatably mounted upon both of these flaps 17 about the pivot axis or shaft 18 is the spindle carrier 9. Any suitable fixing means, as schematically indicated by reference character 30, can be used for the fixation of the spindle carrier 9 in any desired position.

According to the showing of FIG. IV a respective holder 6 is attached both to the first spindle 2 as well as also the second spindle 5 and in which holders 6, just as was the case for the embodiment of FIG. I, there engages the bolts 7 as shown. One of the bolts 7 is attached to the first headstock 1 by the threading 4a or by other convenient means and the other bolt 7 is attached, again for instance by the threading 4a at the second headstock 4. Again these bolts 7 secure both of the spindles 2 and 5 and their holders 6 against rotation.

Just as was the case for the embodiment of FIG. I, here also a respective spindle carrier or support 9 and 9a is mounted at both of the holders 6 and in which there is rotatably mounted a third spindle 10 and a fourth spindle 10a, respectively.

Secured to the third spindle 10 is a gear 19 having internal teeth and at the fourth spindle 10a there is secured a gear 20 which meshes with the gear 19.

As described and illustrated in FIG. 3, in each spindle carrier 9, 9a there is arranged a hydraulic unit 14 or equivalent structure, wherein however one of both units 14 functions as a motor and drives one of both spindles 10, 10a, whereas the other unit 14 functions as a brake and brakes the other of both spindles 10, 10a.

Of course, both of the hydraulic units 14 can selectively drive the one spindle 10, 10a while operating as a motor and when functioning as a pump brake the other spindle 10, 10a.

While there is shown and described present preferred embodiments of the invention, it is to be distinctly understood that the invention is not limited thereto, but may be otherwise variously embodied and practiced within the scope of the following claims.

Accordingly, what is claimed is:

1. An apparatus for lapping and testing two gears meshing with one another and the axes of which enclose a random angle with respect to one another, comprising a lapping- and testing machine for gears, the axes of which gears are disposed at essentially right angles to one another, said lapping and testing machine including two headstocks and a respective work spindle rotatably mounted in each said headstock, an auxiliary device including means for securing the auxiliary device at one of both work spindles, said auxiliary device comprising a third work spindle which is inclined through a predetermined angle relative to both of the other work spindles.

2. The apparatus as defined in claim 1, further including a second auxiliary device possessing a fourth work spindle which is inclined through a predetermined angle relative to the third work spindle.

3. The apparatus as defined in claim 1, wherein the auxiliary device further comprises a holder embodying said means for securing the auxiliary device at one of the work spindles, an intermediate element secured to the holder, a spindle carrier in which there is rotatably mounted the third work spindle, a drive- and braking means operatively connected with the third work spindle.

4. The apparatus as defined in claim 1, wherein the auxiliary device comprises a holder embodying said means for securing the auxiliary device at one of the work spindles, a spindle carrier, means for mounting the spindle carrier to be pivotable about an axis at the holder, a drive- and braking means operatively connected with the third work spindle, means for rotatably mounting the third work spindle in said spindle carrier.

5. The apparatus as defined in claim 1, further including means arranged at the lapping- and testing machine in order to secure the work spindles with the auxiliary device against rotation.

6. The apparatus as defined in claim 3, wherein the spindle carrier possesses a hydraulic unit selectively functioning as a motor and pump, said hydraulic unit being drivingly connected with the third work spindle mounted in the spindle carrier for the selective driving and braking thereof.

7. The apparatus as defined in claim 4, further including means provided for the holder in order to secure the spindle carrier against rotation at the holder.

* * * * *